United States Patent [19]

Lees

[11] Patent Number: 4,617,129

[45] Date of Patent: Oct. 14, 1986

[54] SCALE INHIBITION

[75] Inventor: Michael J. Lees, Urmston, England

[73] Assignee: Ciba-Geigy, Ardsley, N.Y.

[21] Appl. No.: 751,647

[22] Filed: Jul. 3, 1985

[30] Foreign Application Priority Data

Jul. 11, 1984 [GB] United Kingdom ............... 8417645

[51] Int. Cl.$^4$ ............................................. C02F 5/14
[52] U.S. Cl. ................................... 210/700; 166/902; 203/7; 210/701; 252/8.552; 252/180
[58] Field of Search ............... 166/244 C, 902; 203/7; 210/638, 639, 699, 700, 701; 252/180, 181, 8.55 B; 260/502.5 R; 562/553

[56] References Cited

U.S. PATENT DOCUMENTS

| | | | |
|---|---|---|---|
| 2,961,311 | 11/1960 | Bersworth et al. | 210/700 |
| 3,505,238 | 7/1970 | Liddell | 252/180 |
| 3,932,303 | 1/1976 | Hollingshad | 252/389 |
| 4,033,896 | 7/1977 | Mitchell et al. | 252/181 |
| 4,079,006 | 3/1978 | Mitchell | 210/700 |
| 4,501,667 | 2/1985 | Cook | 252/180 |

FOREIGN PATENT DOCUMENTS 1438079 6/1976 United Kingdom.

*Primary Examiner*—Peter Hruskoci
*Attorney, Agent, or Firm*—Harry Falber

[57] ABSTRACT

Method of inhibiting the precipitation of calcium carbonate from an aqueous system, comprises adding to the aqueous system a scale precipitation inhibiting amount of bis(phosphonomethylene) aminomethylene carboxylic acid.

Typical aqueous systems usefully treated by the new method are water- or oil well systems, cooling water systems, steam generating systems, sea-water evaporators, hydrostatic cookers, gas-scrubbing systems, closed circuit heating systems, reverse-osmosis systems and aqueous-based refrigeration systems.

3 Claims, No Drawings

SCALE INHIBITION

The present invention relates to the use of bis(phosphonomethylene) aminomethylene carboxylic acid to inhibit the precipitation from aqueous systems of calcium carbonate.

The majority of natural waters contain dissolved salts of metals such as calcium, magnesium, barium and strontium. When water or aqueous systems are subjected to heating or concentration, the salts dissolved or formed therein may form insoluble salts which deposit either as scale on any heat transfer surfaces in contact with the water or aqueous system, or as a precipitate in the bulk water.

Salt and/or scale deposition are troublesome effects and can cause increased costs in maintaining aqueous systems in good working order. Among the problems caused by scale deposits are obstruction or fluid flow, impedance of heat transfer, wear of metal parts, shortening of equipment life, localised corrosion attack and unscheduled equipment shut-down. These problems can arise e.g. in water- or oil wells, water transportation pipelines, steam generating plants, water desalination plants, reverse osmosis equipment, heat transfer equipment and equipment for the transport of products and by-products in aqueous media.

Scales containing calcium carbonate are the most common scale deposits since almost all natural waters contain some soluble calcium salt. Simple contact with air will expose the water to varying concentrations of carbon dioxide, allowing the formation of the bicarbonate anion via carbonic acid:

$$H_2O + CO_2 \rightleftharpoons H_2CO_3$$

$$H_2CO_3 \rightarrow H^+ + HCO_3^-$$

After such contact, water then is liable to precipitate calcium carbonate scale on heating due to thermal decomposition of the bicarbonate ion viz.

$$2HCO_3^- \rightarrow CO_3^{2-} + CO_2 \uparrow + H_2O$$

to the carbonate ion, which subsequently precipitates from the solution as calcium carbonate.

The two principal methods of controlling calcium carbonate scale deposition are:

1. Acid Dosing

The bicarbonate ion present in natural waters is decomposed by reducing the pH of the water, to a value below 7, by the addition of mineral acid such as sulfuric acid viz.

$$HCO_3^- + H^+ \rightarrow H_2O + CO_2 \uparrow$$

In this way, the possibility of carbonate ion forming is obviated. This method has the disadvantage, however, that severe corrosion of the plant equipment can occur unless the treatment is carefully monitored.

2. Additive Treatment

The use of additives to inhibit scale formation is well known. The function of an additive in inhibiting scale precipitation when added in sub-stoichiometric amount i.e. far below that required to sequester or chelate the scale-forming cation, is termed a "threshold effect".

One example of a disclosure of an additive treatment to inhibit scale deposition is that in GB Patent Specification No. 1438079. In this specification, compounds are described having the formula:

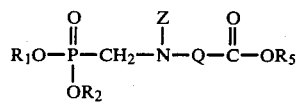

in which $R_1$, $R_2$ and $R_5$ are, inter alia, hydrogen; Z is an optionally substituted alkyl or alkenyl radical e.g. $-CH_2PO_3H_2$; and Q is a divalent, optionally substituted hydrocarbon radical of at least 3 carbon atoms e.g. $-(CH_2)_3-$. A preferred compound is bis(phosphonomethylene) aminotrimethylene carboxylic acid having the formula $N(CH_2PO_3H_2)_2(CH_2)_3COOH$.

In Example IX of GB No. 1438079, comparative data is presented to demonstrate that bis(phosphonomethylene)aminotrimethylene carboxylic acid exhibited superior threshold agent properties in inhibiting calcium sulphate precipitation relative to bis bis(phosphonomethylene)aminomethylene carboxylic acid.

Surprisingly, we have now found that bis(phosphonomethylene) aminomethylene carboxylic acid shows far superior properties in inhibiting calcium carbonate deposition, when compared with bis(phosphonomethylene) aminotrimethylene carboxylic acid or other compounds known to be effective as scale inhibitors for use in water treatment.

Accordingly, the present invention provides a method of inhibiting the precipitation of calcium carbonate from an aqueous system, which comprises adding to the aqueous system, which comprises adding to the aqueous system a scale precipitation-inhibiting amount of bis(phosphonomethylene) aminomethylene carboxylic acid.

Bis(phosphonomethylene) aminomethylene carboxylic acid is a known compound and is conveniently prepared in high yield by the Mannich reaction of either orthophosphorous acid or a dialkyl phosphite with formaldehyde and glycine followed by hydrolysis.

The amount of bis(phosphonomethylene) aminomethylene carboxylic acid used in the method of the invention is conveniently from 1 to 200 ppm, preferably 1 to 30 ppm, based on the aqueous system.

With respect to aqueous systems which may be treated according to the present invention of particular interest are water- or oil wells, water transportation pipelines cooling water systems, steam generating systems, sea-water evaporators, hydrostatic cookers, gas scrubbing systems, closed circuit heating systems, reverse osmosis equipment and aqueous-based refrigeration systems.

In the particular case of the inhibition of scale and corrosion in oil field applications, special problems are presented which are not encountered in more conventional water treatment application. Thus, formation water, associated with oil-bearing strata, often contains barium and strontium as well as ions such as calcium, magnesium, carbonate and bicarbonate ions which are more commonly found in surface waters and sea water. Therefore, in situations in which surface or sea water becomes mixed with formation water, severe scaling can occur due to the precipitation of barium sulphate, strontium sulphate, calcium carbonate and mixtures thereof. This type of scaling occurs e.g. during cooling- /depressurisation of recovered crude oil/water emulsions in the rock formation in the well base and in the well bore when water is pumped into the formation to "squeeze" a well. This type of scale formation can be effectively inhibited by the method according to the present invention.

Bis(phosphonomethylene) aminomethylene carboxylic acid may be used alone, or in conjunctions with other compounds known to be useful in the treatment of aqueous systems, e.g. corrosion inhibitors, further dispersing and/or threshold agents, precipitating agents, oxygen scavengers, sequestering agents, antifoaming agents and biocides.

Corrosion inhibitors which may be used include water-soluble zinc salts; phosphates; polyphosphates; phosphonic acids and their salts, e.g. acetodiphosphonic acid, nitrilotris methylene phosphonic acid and methylamino dimethylene phosphonic acid; other phosphonocarboxylic acids and their salts, for example, 2-hydroxyphosphonoacetic acid as well as those described in German Offenlegungsschrift No. 2632774, 2-phosphonobutane-1,2,4-tricarboxylic acid and those disclosed in GB No. 1572406; chromates for example, sodium chromate; nitrates, for example sodium nitrate; nitrites e.g. sodium nitrite; molybdates e.g. sodium molybdate; silicates e.g. sodium silicate; benzotriazole, tolutriazole 5,5-methylene-bis-benzotriazole or copper deactivating benzotriazole or tolutriazole derivates; N-acyl sarcosines; N-acylimino diacetic acids; ethanolamines; fatty amines; and polycarboxylic acids, for examples, polymaleic acid and polyacrylic acid, as well as their respective alkali metal salts, copolymers of maleic anhydride, copolymers of acrylic acid, and substituted derivatives of polymaleic and polyacrylic acids and their copolymers.

Moreover, bis(phosphonomethylene) aminomethylene carboxylic acid may be used in conjunction with further dispersing and/or threshold agents. e.g. polymerised acrylic acid (or its salts), phosphinopolycarboxylic acids (as described and claimed in British Pat. No. 1458235), hydrolysed polyacrylonitrile, polymerised methacrylic acid and its salts polyacrylamide and copolymers thereof from acrylic and methacrylic acids, lignin sulphonic acid and its salts, tannin, naphthalene sulphonic acid/formaldehyde condensation products, starch and its derivatives, cellulose, acrylic acid/lower alkyl hydroxyacrylate copolymers such as those described in U.S. Pat. No. 4,029,577, styrene/maleic anhydride copolymers and sulfonated styrene homopolymers such as those described in U.S. Pat. No. 4,374,733, and combinations thereof. Specific threshold agents, such as for example, 2-phosphonobutane-1,2,4-tricarboxylic acid, acetodiphosphonic acid, hydrolysed polymaleic anhydride and its salts, alkyl phosphonic acids, 1-aminoalkyl-1,1-diphosphonic acids and their salts, and alkali metal polyphosphates, may also be used.

Precipitating agents are e.g. alkali metal orthophosphates, carbonates; oxygen scavengers are e.g. alkali metal sulphites and hydrazines; sequestering agents include nitriloacetic acid and its salts; antifoaming agents used may be silicones e.g. polydimethylsiloxanes, distearylsebacamide, distearyl adipamide and related products derived from ethylene oxide and/or propylene oxide condensations, in addition to fatty alcohols, such as capryl alcohols and their ethylene oxide condensates; and biocides are e.g. amines, quaternary ammonium compounds, chlorophenols, sulphur-containing compounds such as sulphones, methylene bis thiocyanates and carbamates, isothiazolones, brominated propionamides, triazines, phosphonium compounds, chlorine and chlorine-release agents and organometallic compounds such as tributyl tin oxide.

The following Examples further illustrate the present invention.

Preparation of bis(phosphonomethylene) aminomethylene carboxylic acid 75 g (1 mole) glycine, 164 g (2 moles) orthophosphorous acid, 100 mls water and 200 mls (=2 moles) concentrated hydrochloric acid are mixed and heated to reflux (112° C.), and 241 g (=2.96 mole HCHO) 37% formalin are added dropwise over 1 hour. During this time, the reflux temperature falls to 105° C., the reaction mixture is maintained at this temperature for a further 90 minutes, then cooled to room temperature.

The resulting solution is concentrated to half its original volume, then diluted with 1.5 liters of ethanol and allowed to stand overnight.

The white crystalline material is filtered off, washed with 250 mls hot (50° C.) acetone then dried under vacuum. There are obtained 157 g (59.7%) of product having the following elemental analysis:

Calculated for $C_4H_{11}HO_8P_2$: C 18.25%; H 4.18%; N 5.32%; P 23.57%. Found: C 18.12%; H 4.09%; N 5.23%; P 23.29%.

and melting at 204°–7° C. with decomposition.

EXAMPLE 1

NACE Threshold Test—Inhibition of precipitation of calcium carbonate (NACE=National Association of Corrosion Engineers)

Solutions are prepared in distilled water of calcium nitrate (1.470 g/l of $Ca(NO_3)_2.4H_2O$ and sodium carbonate (0.646 g/l $Na_2CO_3$).

A 0.1% (weight/volume) solution of bis(phosphonomethylene) aminomethylene carboxylic acid in distilled water is prepared.

50 ml of the calcium nitrate solution are placed in a small glass bottle (112 ml capacity) fitted with a screw cap. To this solution is added sufficient solution of bis(phosphonomethylene) aminomethylene carboxylic acid in distilled water to provide the required concentration of bis(phosphonomethylene) aminomethylene carboxylic acid in the final volume of test solution (100 ml). Thus 1.0 ml of 0.1% solution of test compound gives a concentration of test compound in the final solution of 10 ppm.

50 ml of the sodium carbonate solution are added to the bottle which is shaken to effect mixing. The bottle is sealed and immersed in a constant temperature bath at 25° C. for 24 hours.

A 25 ml sample of the solution is withdrawn, 2 sodium hydroxide pellets and 2 crystals of Patton and Reeder's reagent [2-hydroxy-1-(2'-hydroxy-4'-sulfo-1'-naphthylazo)-3-naphthoic acid]are added and the mixture is agitated to effect dissolution of the solids.

The dissolved calcium is titrated with a standard 0.1M solution of the disodium salt of EDTA until all traces of pink colour have been dispelled from the blue colour of the end.

The percentage inhibition of calcium carbonate precipitation is calculated from the relation:

$$\% \text{ inhibition} = \frac{(\text{titre} - \text{blank titre})}{(7.78 - \text{blank titre})} \times \frac{100}{1}$$

The blank titre is obtained from test solutions containing no scale inhibitor and 7.78 is the maximum possible titration to give 100% inhibition.

The results obtained is set out in Table I.

TABLE I

NACE Test

| Additive | Structure | % inhibition to precipitation at dose level | | |
|---|---|---|---|---|
| | | 5 ppm | 7.5 ppm | 10 ppm |
| Bis(phosphonomethylene) aminomethylene carboxylic acid | $(H_2O_3PCH_2)_2NCH_2CO_2H$ | 94 | 95 | 95 |

EXAMPLE 2

The following stock solutions (1) and (2) are prepared in distilled water:

Solution (1):
 1.4700 g/l $Ca(NO_3)_2.4H_2O$
 6.2700 g/l $MgCl_2.6H_2O$
 30.0000 g/l NaCl Solution (2):
 0.6400 g/l $Na_2CO_3$
 30.0000 g/l NaCl.

This corresponds to contents of $Ca^{2+}$ of 125 ppm; $Mg^{2+}$ of 375 ppm; and $CO_3^{3-}$ of 182.8 ppm in the final test solution (100 ml).

A 0.1% weight/weight solution of bis(phosphonomethylene) aminomethylene carboxylic acid in distilled water is prepared.

50 ml of solution (1) are placed in a glass bottle (112 ml capacity) having a screw cap. To this is added the volume of the solution of bis(phosphonomethylene) aminomethylene carboxylic acid to give the required concentration in the final volume of test solution.

50 mls of solution (2) are added and the mixture is shaken at 85° C. in a water bath for 30 minutes.

25 mls of the clear solution are withdrawn, filtering if necessary, and the $Ca^{2+}$ concentration is determined titrimetrically using a 0.1M EDTA standard solution and Patton and Reeder's indicator.

The percentage inhibition of calcium carbonate was calculated from the relation:

$$\% \text{ inhibition} = \frac{[(Ca^{2+}) \text{ in solution} - (Ca^{2+}) \text{ in control}]}{[125 - Ca^{2+}) \text{ in control}]} \times 100$$

in which 125 is the content of $(Ca^{2+})$ in ppm in the final test in Table II:

TABLE II

Calcium carbonate threshold test

| Additive | Structure | % inhibition to precipitation at dose level | |
|---|---|---|---|
| | | 1 ppm | 2 ppm |
| Bis(phosphonomethylene) aminomethylene carboxylic acid | $(H_2O_3PCH_2)_2NCH_2CO_2H$ | 93 | 93 |

What is claimed is:

1. A method of inhibiting the precipitation of calcium carbonate from an aqeuous system, comprising adding to the aqueous system an effective precipitation inhibiting amount of bis(phosphonomethylene) aminomethylene carboxylic acid to inhibit said precipitation of said calcium carbonate.

2. Method according to claim 1 wherein the amount of bis(phosphonomethylene) aminomethylene carboxylic acid added to the aqueous system is from 1 to 200 ppm, based on the aqueous system.

3. Method according to claim 2 wherein the amount of bis(phosphonomethylene) aminomethylene carboxylic acid added to the aqueous system is from 1 to 30 ppm, based on the aqueous system.

* * * * *